United States Patent
Morimura (10) Patent No.: US 10,307,877 B2
(45) Date of Patent: Jun. 4, 2019

(54) MACHINE TOOL (71) Applicant: OKUMA Corporation, Niwa-gun, Aichi (JP)

(72) Inventor: Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 16 days.

(21) Appl. No.: 15/581,372

(22) Filed: Apr. 28, 2017

(65) Prior Publication Data

US 2017/0326700 A1 Nov. 16, 2017

(30) Foreign Application Priority Data

May 11, 2016 (JP) .................................. 2016-095532

(51) Int. Cl.
*B23Q 11/00* (2006.01)
*B23K 26/00* (2014.01)
*B23Q 11/10* (2006.01)
*B23Q 17/24* (2006.01)
*B25J 9/00* (2006.01)
*B25J 11/00* (2006.01)
*B23Q 1/76* (2006.01)
*B23Q 7/04* (2006.01)
*B23Q 17/00* (2006.01)

(52) U.S. Cl.
CPC ........ *B23Q 11/005* (2013.01); *B23K 26/0093* (2013.01); *B23Q 1/76* (2013.01); *B23Q 7/04* (2013.01); *B23Q 11/0032* (2013.01); *B23Q 11/0075* (2013.01); *B23Q 11/1084* (2013.01); *B23Q 17/00* (2013.01); *B23Q 17/2409* (2013.01); *B25J 9/0096* (2013.01); *B25J 11/005* (2013.01)

(58) Field of Classification Search
CPC ............ Y10T 82/2572; Y10T 82/2571; Y10T 82/2502; Y10T 82/2504; Y10T 82/2521
See application file for complete search history.

(56) References Cited

U.S. PATENT DOCUMENTS 2,315,393 A * 3/1943 Bowerman ............ B23Q 3/101
　　　　　　　　　　　　　　　　　　　　　　　248/282.1
3,963,271 A * 6/1976 Sugino .................... B25J 15/103
　　　　　　　　　　　　　　　　　　　　　　　294/106
4,359,815 A * 11/1982 Toyoda .............. B23Q 3/15713
　　　　　　　　　　　　　　　　　　　　　　　414/225.01

(Continued)

FOREIGN PATENT DOCUMENTS

CN　　101670535 A　　3/2010
CN　　204975353 U　　1/2016

(Continued)

OTHER PUBLICATIONS

Japanese Translation of Notice of Opinion on Examination corresponding to Application No. 106115550; dated Jan. 8, 2019.

*Primary Examiner* — Will Fridie, Jr.
(74) *Attorney, Agent, or Firm* — Cantor Colburn LLP (57) ABSTRACT

A machine tool that machines a workpiece by a tool includes a workpiece spindle device that holds the workpiece in a rotatable manner with a predefined workpiece rotational axis Rw as a center, one or more in-machine robots, and a connecting mechanism that attaches the one or more robots on the machine tool so that the one or more robots move independently from the workpiece, with the workpiece rotational axis Rw serving as a center.

10 Claims, 7 Drawing Sheets

(56) References Cited

U.S. PATENT DOCUMENTS

| | | | | |
|---|---|---|---|---|
| 4,432,063 A * | 2/1984 | Resnick | ............... | B25J 9/161 318/568.13 |
| 4,838,135 A * | 6/1989 | Hevoyan | ............... | B23Q 7/04 82/124 |
| 4,878,705 A * | 11/1989 | Arnquist | ............... | B25J 15/103 294/116 |
| 5,168,609 A * | 12/1992 | Kojima | ............... | B23B 3/06 29/27 R |
| 5,254,068 A * | 10/1993 | Yamada | ............... | G05B 19/40937 29/27 R |
| 5,634,377 A * | 6/1997 | Kimura | ............... | B25J 9/042 74/490.03 |
| 5,758,554 A * | 6/1998 | Miyano | ............... | B23B 3/167 82/1.11 |
| 9,308,644 B2 * | 4/2016 | Hsieh | ............... | B25J 9/044 |
| 2007/0199361 A1 * | 8/2007 | Yogo | ............... | B21D 7/024 72/149 |
| 2009/0143206 A1 * | 6/2009 | Terazono | ............... | B23B 31/39 483/20 |
| 2010/0028117 A1 * | 2/2010 | Nihei | ............... | B25J 9/0009 414/728 |
| 2010/0061830 A1 * | 3/2010 | Kitayama | ............... | B23Q 7/04 414/222.05 |
| 2010/0288088 A1 * | 11/2010 | Miyamoto | ............... | B23Q 1/76 82/1.11 |
| 2015/0033898 A1 * | 2/2015 | Hsieh | ............... | B25J 17/02 74/490.06 |
| 2016/0031088 A1 * | 2/2016 | Suzuki | ............... | B23Q 11/0891 414/222.08 |
| 2016/0325386 A1 * | 11/2016 | Farah | ............... | B23K 37/047 |
| 2016/0339553 A1 * | 11/2016 | Nakazawa | ............... | B23Q 11/10 |
| 2017/0008102 A1 * | 1/2017 | Ishikawa | ............... | B23D 55/06 |
| 2017/0028499 A1 * | 2/2017 | Yoshida | ............... | B23K 9/0956 |
| 2017/0113314 A1 * | 4/2017 | Murota | ............... | B08B 5/02 |
| 2017/0205798 A1 * | 7/2017 | Ishii | ............... | B23P 19/066 |
| 2017/0312875 A1 * | 11/2017 | Kunihiro | ............... | B23Q 7/043 |
| 2017/0329316 A1 * | 11/2017 | Morimura | ............... | B25J 15/0019 |
| 2018/0056503 A1 * | 3/2018 | Morimura | ............... | B23Q 7/04 |
| 2018/0059637 A1 * | 3/2018 | Shimodaira | ............... | G05B 19/401 |
| 2018/0093380 A1 * | 4/2018 | Yoshida | ............... | B25J 5/007 |
| 2018/0147730 A1 * | 5/2018 | Yamane | ............... | B25J 15/08 |

FOREIGN PATENT DOCUMENTS

| | | |
|---|---|---|
| JP | 05301141 A | 11/1993 |
| JP | 05301142 A | 11/1993 |
| JP | 2010036285 A | 2/2010 |
| JP | 2010064158 A | 3/2010 |
| WO | 8902343 A1 | 3/1989 |

* cited by examiner

MACHINE TOOL

CROSS REFERENCE TO RELATED APPLICATION

The entire disclosure of Japanese Patent Application No. 2016-095532 filed on May 11, 2016, including the specification, claims, drawings, and abstract, is incorporated herein by reference in its entirety.

TECHNICAL FIELD

The present disclosure relates to a machine tool that machines a workpiece by a tool.

BACKGROUND

Recently, demands are increasing for automation and higher performances of machine tools. In order to realize automation, automatic changer apparatuses are proposed such as an automatic tool changer (ATC) which automatically changes tools, and an automatic palette changer (APC) which automatically changes a palette on which a workpiece is mounted. In addition, peripheral apparatuses such as a workpiece supply apparatus such as a loader and a bar feeder are also widely known. In order to realize higher performance, in-machine measurement and intelligent system using sensors are also employed.

Further, in order to automate or improve performance of machine tools, in some cases, use of a robot is proposed. For example, JP 2010-36285 A discloses a technique in which a robot provided outside of the machine tool is used, to execute attachment and detachment of the workpiece to and from the machine tool. JP 2010-64158 A discloses a technique in which an articulated robot which travels on a gantry rail attached on an upper part of the machine tool is provided, and the transport of the workpiece or the like among a plurality of machine tools is executed by the articulated robot. JP H5-301141 A and JP H5-301142 A disclose a transporting tool of a workpiece which transports the workpiece by an open/close operation of a grip unit. The transporting tool has an arm shape, and is attached to a body function box. The body function box is also provided at a right side of a spindle head which supports a spindle. The transporting tool can pivot about an axis approximately orthogonal to a long axis of the spindle. The transporting tool can change, by the pivoting movement, between a state in which the arm is approximately horizontal and a state in which the arm is approximately vertical.

In the related art, however, no robot is described which can access the workpiece with various positions and orientations. Specifically, normally, a body part of the machine tool is covered with a cover in view of safety and the surrounding environment. Therefore, when it is desired to access an inside of a machining chamber using a robot provided at a location other than the body part of the machine tool as in JP 2010-36285 A and JP 2010-64158 A, a door of the machining chamber must be opened. Thus, with the robots of JP 2010-36285 A and JP 2010-64158 A, while it is possible to attach or detach the workpiece when the workpiece is not being machined, it is not possible for the robot to access the workpiece during the machining; that is, when the door of the machining chamber is closed. As a result, with the techniques of JP 2010-36285 A and JP 2010-64158 A, usage of the robots is limited.

As described in JP H5-301141 A and JP H5-301142 A, there exist techniques in which a robot such as a transporting tool is fixed on a spindle head which holds a rotary tool in a manner to allow self-rotation. According to such techniques, the robot can access the workpiece and the tool even in the state where the door of the machining chamber is closed. However, because the transporting tools of JP H5-301141 A and JP H5-301142 A are fixed on the spindle head, accessibility to the work is inferior.

In order to improve the accessibility to the workpiece, a configuration may be employed in which the robot is placed near the workpiece. However, in the case of a structure where the robot is fixed near the workpiece, if it is desired to allow access to the workpiece from various directions, a movable range of the robot itself must be widened and the degree of freedom must be increased. In order to do so, it is necessary to increase the number of joints of the robot and to elongate the arm.

An advantage of the present disclosure lies in the provision of a machine tool having a robot which can access the workpiece from various directions while preventing interference with other members.

SUMMARY

According to one aspect of the present disclosure, there is provided a machine tool that machines a workpiece by a tool, the machine tool comprising: a rotary device that holds the workpiece in a rotatable manner with a predefined workpiece rotational axis as a center; one or more robots; and a connecting mechanism that attaches the one or more robots on the machine tool so that the one or more robots move independently from the workpiece, with the workpiece rotational axis serving as a center.

The robot may be able to access at least one of the tool and the workpiece during execution of machining of the workpiece by the tool.

The robot may execute at least one of a support of machining of the workpiece by the tool, sensing related to the tool or the workpiece during the machining, and additional machining.

The robot may be an arm-type robot comprising: one or more end effectors that act on a target; one or more arms that support the one or more end effectors; and one or more joints provided at ends of the one or more arms.

The machine tool may be a lathe or a cylindrical grinding machine, and the rotary device may be a workpiece spindle device that holds the workpiece in a manner to allow self-rotation.

The machine tool may be a milling machine or a machining center, and the rotary device may be a rotation table on which the workpiece is placed.

The robot may be attached on the rotary device via the connecting mechanism.

When the machine tool is a lathe or a cylindrical grinding machine, the robot may be attached via the connecting mechanism to a tailstock placed opposing the workpiece spindle device.

According to a machine tool of various aspects of the present disclosure, a robot is attached movable with a workpiece rotational axis serving as a center. Because of this, even when a size of the robot is reduced, a position and an orientation of the robot can be significantly changed. As a result, according to the machine tool of various aspects of the present disclosure, the robot can access the workpiece from various directions while preventing interference between the robot and other members.

BRIEF DESCRIPTION OF DRAWINGS

Embodiment(s) of the present disclosure will be described by reference to the following figures, wherein.

DESCRIPTION OF EMBODIMENTS

Figure 1:
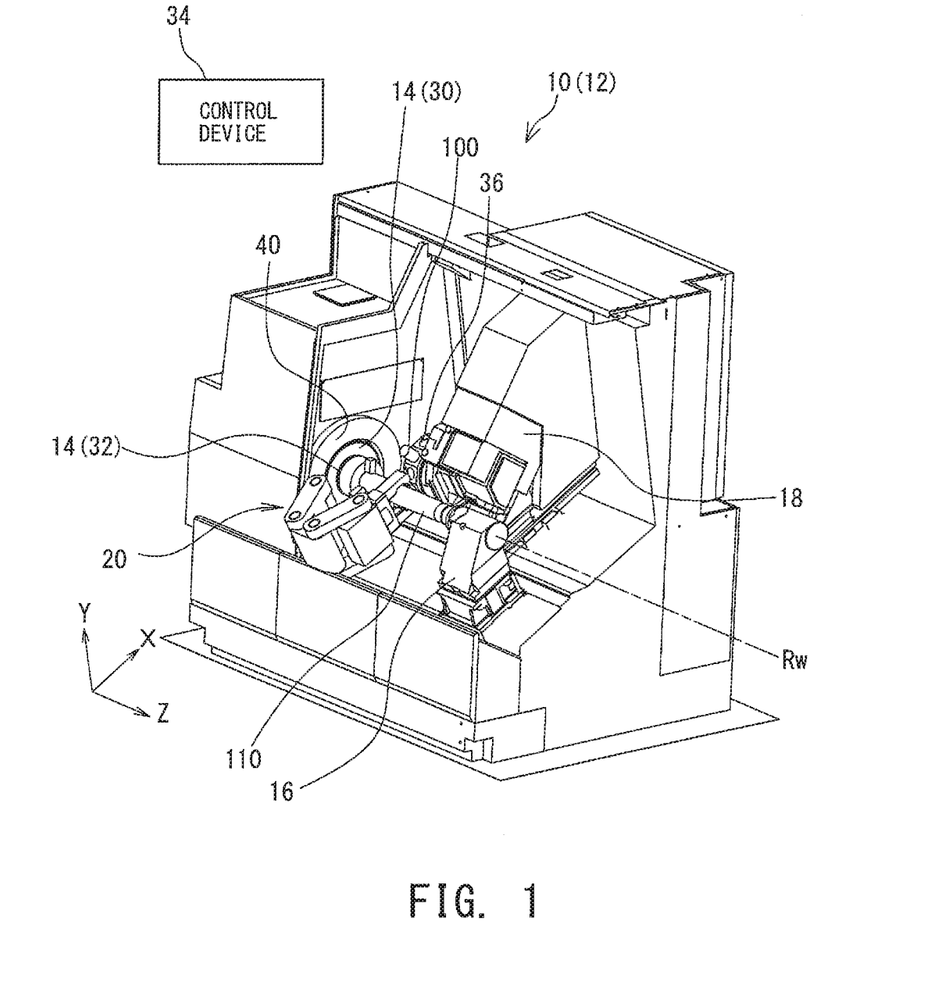
FIG. 1 is a diagram showing a structure of a machine tool.

A structure of a machine tool 10 will now be described with reference to the drawings. FIG. 1 is a diagram schematically showing a structure of the machine tool 10. In the following description, a rotational axis direction of a workpiece spindle 32 will be referred to as a Z-axis, a movement direction of a tool post 18 orthogonal to the Z-axis will be referred to as an X-axis, and a direction orthogonal to the X-axis and the Z-axis will be referred to as a Y-axis. On the Z-axis, a direction from the workpiece spindle 32 toward a tailstock 16 will be referred to as a positive direction. On the X-axis, a direction from the workpiece spindle 32 toward the tool post 18 will be referred to as a positive direction, and on the Y-axis, an upward direction from the workpiece spindle 32 will be referred to as a positive direction.

The machine tool 10 is a lathe which machines a workpiece 110 by bringing a tool 100 held on the tool post 18 into contact with the workpiece 110, which self-rotates. The machine tool 10 is a lathe which is called a turning center which is NC controlled and which holds a plurality of tools 100. A periphery of a body 12 of the machine tool 10 is covered by a cover (not shown). A space defined by the cover is a machining chamber where machining of the workpiece 110 takes place. On the cover, at least one opening and a door which opens and closes the opening (both of which are not shown in the figure) are formed. An operator accesses the body 12 of the machine tool 10, the workpiece 110, or the like through the opening. During the machining, the door provided on the opening is closed. This is for sake of safety and the surrounding environment.

The body 12 comprises a workpiece spindle device 14 which holds one end of the workpiece 110 in a manner to allow self-rotation, the tool post 18 which holds the tool 100, and the tailstock 16 which supports the other end of the workpiece 110. The workpiece spindle device 14 comprises a spindle base 30 having a driving motor or the like built therein, and the workpiece spindle 32 attached to the spindle base 30. The workpiece spindle 32 includes a chuck 33 and a collet which hold the workpiece 110 in a detachable manner, and the workpiece 110 to be held can be arbitrarily exchanged. The workpiece spindle 32 and the chuck 33 also self-rotate with a workpiece rotational axis Rw which extends in the horizontal direction (Z-axis direction in FIG. 1) serving as a center.

On the workpiece spindle device 14, an in-machine robot 20 is attached via a connecting mechanism 40. The in-machine robot 20 is used for a support of machining, various sensing processes, support work, or the like. A structure and a function of the in-machine robot 20 will be described in detail later.

The tailstock 16 is placed opposing the workpiece spindle device 14 in the Z-axis direction, and supports the other end of the workpiece 110 held by the workpiece spindle device 14. The tailstock 16 is placed at a position where a center axis of the tailstock 16 coincides with the workpiece rotational axis Rw. On the tailstock 16, a center having a tip sharpened in a conical shape is attached, and during the machining, the tip of the center is in contact with a center point of the workpiece 110. The tailstock 16 is movable in the Z-axis direction so that the tailstock 16 can move toward and away from the workpiece 110.

The tool post 18 holds the tool 100; for example, a tool called a "bite." The tool post 18 is movable in the Z-axis direction. In addition, the tool post 18 is placed on a guiderail which extends in the X-axis direction, and can be moved also in the X-axis direction. On a tip of the tool post 18, a turret 36 which can hold a plurality of tools 100 is provided. The turret 36 is rotatable with an axis extending in the Z-axis direction serving as a center. By the turret 36 rotating, the tool 100 used for machining the workpiece 110 can be suitably changed. By moving the tool post 18 in the Z-axis direction, the tool 100 held on the turret 36 is moved in the Z-axis direction. By moving the tool post 18 in the X-axis direction, the tool 100 held on the turret 36 is moved in the X-axis direction. By moving the tool post 18 in the X-axis direction, an amount of cutting of the workpiece 110 by the tool 100 or the like can be changed.

A control device 34 controls driving of various parts of the machine tool 10 in response to a command from an operator. The control device 34 is formed from, for example, a CPU which executes various calculations, and a memory which stores various control programs and control parameters. The control device 34 further has a communication function, and can exchange various data such as, for example, NC program data, with other devices. The control device 34 may include, for example, a numerical control device that calculates, when necessary, positions of the tool 100 and the workpiece 110. The control device 34 may be a single device or a combination of a plurality of calculator devices.

Figure 2:
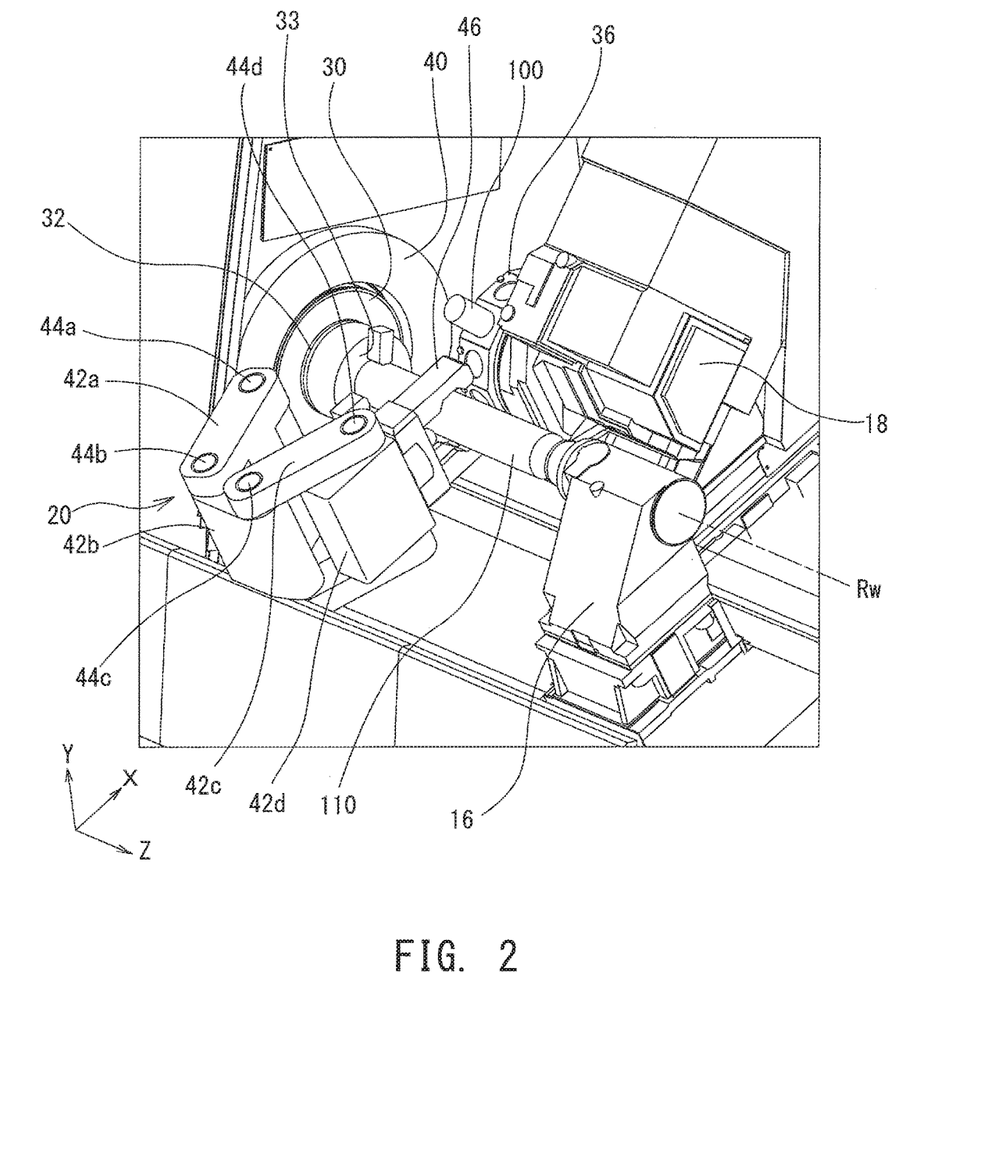
FIG. 2 is an enlarged view of a periphery of a workpiece spindle device.

Next, the in-machine robot 20 attached to the workpiece spindle device 14 will be described with reference to FIGS. 2-6. FIGS. 2-6 are perspective diagrams of a periphery of the in-machine robot 20. As shown in FIG. 2, the in-machine robot 20 is an articulated robot and an arm-type robot, having a plurality of arms 42a-42d and a plurality of joints 44a-44d. As already described, the in-machine robot 20 is attached to an outer periphery of the spindle device 30 via the connecting mechanism 40. In FIG. 2, a large portion of the spindle base 30 is hidden by a housing, but the spindle base 30 has an approximate circular tube shape extending in the Z-axis direction. The connecting mechanism 40 has an approximate ring shape surrounding the outer periphery of the spindle base 30. The connecting mechanism 40 has a hollow rotary joint attached on the spindle base 30 via a bearing. The connecting mechanism 40 is rotatable with respect to the spindle base 30, and a rotational center thereof coincides with the workpiece rotational axis Rw. An actuator such as a motor is attached on the connecting mechanism 40, and driving of the actuator is controlled by the control device 34.

The in-machine robot 20 comprises the first through fourth arms 42a-42d (hereinafter, when "first" through "fourth" are not to be distinguished, the letter in the reference numeral will be omitted, and the arms will be simply referred to as "arms"; the same convention is applicable to other constituting elements), the first through fourth joints 44a-44d provided respectively at ends of the arms, and an end effector 46. A base end of the first arm 42a is connected to the connecting mechanism 44 via the first joint 44a, a base end of the second arm 42b is connected to a tip end of the first arm 42a via the second joint 44b, a base end of the third arm 42c is connected to a tip end of the second arm 42b via the third joint 44c, and a base end of the fourth arm 42d is connected to a tip of the third arm 42c via the fourth joint 44d. Each of the first through fourth joints 44a-44d has a predetermined swing axis, and each arm 42 swings around the swing axis as a center. An actuator such as a motor is attached to each of the first through fourth joints 44a-44d, and driving of the actuator is controlled by the control device 34. The control device 34 calculates a position of the end effector 46 to be described later, based on an amount of driving of the actuator provided on the connecting mechanism 40 and the joints 44a-44d.

On a tip end of the fourth arm 42d, the end effector 46 which acts on a target is provided. No particular limitation is imposed on the end effector 46, so long as the end effector 46 realizes some effect. Therefore, the end effector 46 may be, for example, a sensor which senses information related to a target or a peripheral environment of the target. In this case, the end effector 46 may be, for example, a contact sensor which detects presence/absence of contact with the target; a distance sensor which detects a distance to the target; a vibration sensor which detects vibration of the target; a pressure sensor which detects a pressure applied by the target; or a sensor which detects a temperature of the target. A detection result of the sensor is stored and analyzed in correlation to positional information of the end effector 46 calculated based on the amounts of driving of the connecting mechanism 40 and the joints 44a-44d. For example, when the end effector 46 is a contact sensor, the control device 34 analyzes a position, a shape, and a movement of the target based on the timing of detection of the contact with the target, and the positional information acquired at this timing.

Alternatively, as another configuration, the end effector 46 may be a holding mechanism which holds the target. The form of holding may be a hand type in which the target is gripped by a pair of members, a type of suctioning and holding the target, or a type in which the target is held using a magnetic force or the like. FIGS. 2-6 exemplify a hand-type end effector 46. As an alternative configuration, the end effector 46 may be a pressing mechanism which presses a target. For example, the end effector 46 may be a roller or the like which is pressed against the workpiece 110 to suppress vibration of the workpiece 110.

As an alternative configuration, the end effector 46 may be a device which discharges fluid for supporting machining. Specifically, the end effector 46 may be a device which discharges air for blowing swarf, or which discharges a cooling fluid (cutting oil, cutting water, or the like) for cooling the tool 100 or the workpiece 110. Alternatively, the end effector 46 may be a device which discharges energy or a material for forming a workpiece. Therefore, for example, the end effector 46 may be a device which discharges laser or arc, or a device which discharges a material for layering and forming. Further, as an alternative configuration, the end effector 46 may be a camera which captures an image of the target. In this case, an image obtained by the camera may be displayed on an operation panel or the like.

No particular limitation is imposed on the target on which the end effector 46 acts, so long as the target is located within the machining chamber. Therefore, the target may be the workpiece 110 held on the workpiece spindle device 14, or the tool 100 held on the tool post. In addition, the target may be a target other than the tool 100 and the workpiece 110, and may be, for example, the swarf spread in the machining chamber, a component assembled to the workpiece 110, or a constituting component of the machine tool 10 (such as the chuck 33 of the workpiece spindle 32, or the like).

In the above description, the number of the end effector 46 is described as one, but the number of end effector 46 is not limited to one, and may be a plurality. Further, it is sufficient that the end effector 46 is provided at least on the in-machine robot 20, and the provision position is not limited to the tip of the articulated arm, and may alternatively be partway on the articulated arm.

Next, a movement of the in-machine robot 20 as described above will be described. When the workpiece 110 is machined, the tool 100 held on the tool post 18 is held in contact with the workpiece 110 while the workpiece 110 is self-rotated by the workpiece spindle device 14. The in-machine robot 20 attached on the workpiece spindle device 14 executes a support of machining, sensing processes, support work, or the like as necessary. In this process, the in-machine robot 20 moves the connecting mechanism 40 and the joints 44 as necessary, to change a position and an orientation of the end effector 46. In particular, in the exemplified cases, the in-machine robot 20 can be rotated around the workpiece rotational axis Rw as a center according to the position and orientation of the end effector 46 accessing the target. In other words, the in-machine robot 20 can move at the periphery of the workpiece spindle 32 with the workpiece rotational axis Rw serving as a center. In the following description, the description "access" means that the in-machine robot 20 moves close to the target, to a position where the objective of the operation of the in-machine robot 20 can be achieved. Therefore, when the end effector 46 of the in-machine robot 20 is a temperature sensor which contacts the target and detects the temperature thereof, the description "access" means that the end effector 46 moves close to the target, to a position where the end effector 46 contacts the target. When the end effector 46 is a temperature sensor which detects the temperature without contact, the description "access" means that the end effector 46 moves close to the target, to a position where the temperature of the target can be detected.

Figure 3:
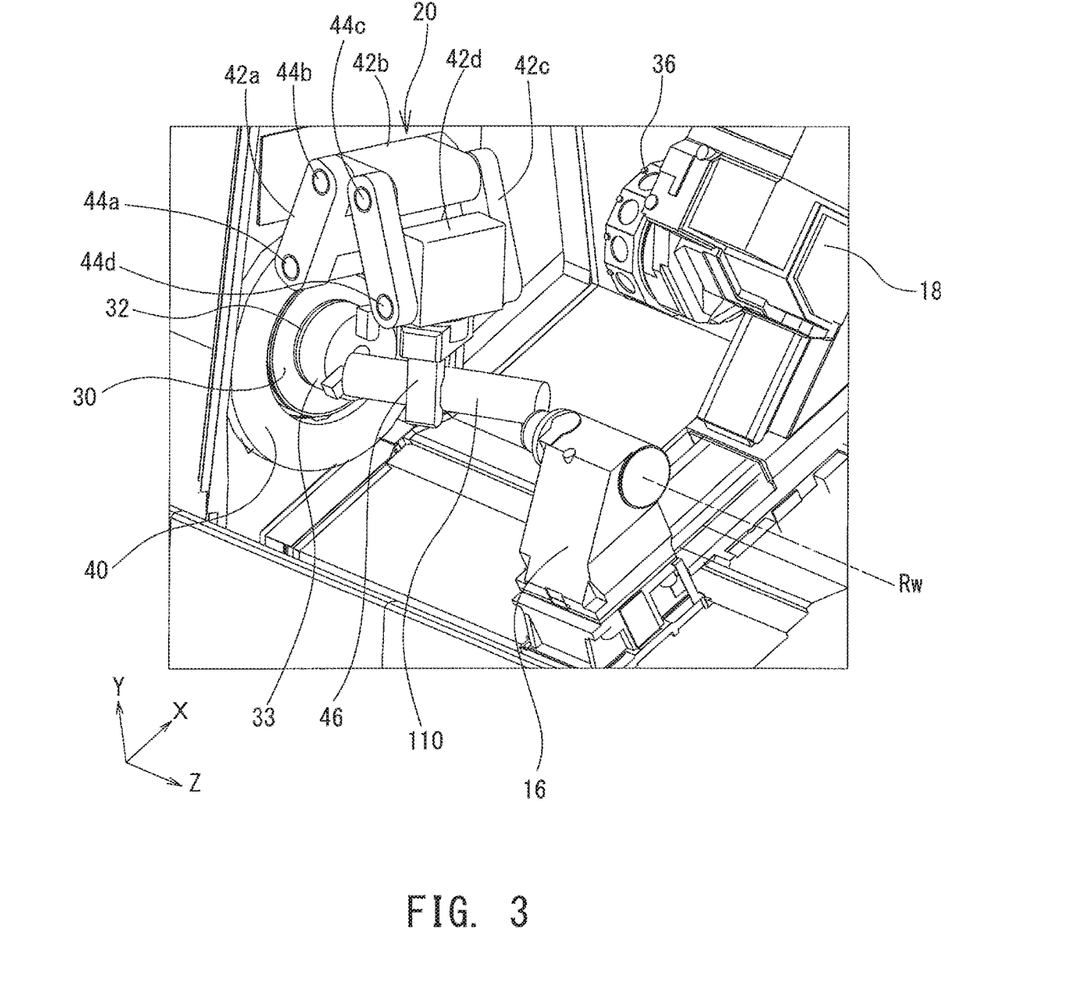
FIG. 3 is an enlarged view of a periphery of a workpiece spindle device.

When it is desired that the end effector 46 accesses the target (for example, the workpiece 110) positioned near the workpiece spindle 32 from a negative side in the X-axis direction, as shown in FIG. 2, the connecting mechanism 40 is rotated so that the first arm 42a is positioned at a more negative side in the X-axis direction than the workpiece spindle 32. In this state, the joints 44 are driven so that the end effector 46 accesses the target. On the other hand, when it is desired that the end effector 46 accesses the target (for example, the workpiece 110) positioned near the workpiece spindle 32 from an upper side in the vertical direction, as shown in FIG. 3, the connecting mechanism 40 is rotated so that the first arm 42a is positioned at an upper side in the vertical direction in relation to the workpiece spindle 32. In this state, the joints 44 are driven so that the end effector 46 accesses the target.

The in-machine robot 20 may be used for various purposes. For example, the in-machine robot 20 may help the machining during the machining of the workpiece 110. Specifically, for example, as shown in FIG. 2, the in-machine robot 20 supports at least one of the workpiece 110 and the tool 100 during the machining. During the machining, because the workpiece 110 rotates around the Z-axis, when the workpiece 110 is to be supported by the end effector 46 during the machining, it is desirable that a roller which does not block rotation of the workpiece 110 or a hand having such a roller is employed as the end effector 46. In either case, by supporting the workpiece 110 or the tool 100 with the end effector 46, it becomes possible to suppress vibration and deflection of the workpiece 110 or the tool 100 having a low rigidity. In addition, by suppressing the vibration of the workpiece 110, a complex workpiece shape can be handled. FIG. 2 shows the in-machine robot 20 supporting the workpiece 110. Further, as an alternative configuration, the in-machine robot 20 may apply vibration to the workpiece 110 and the tool 100 during the machining. With such a configuration, a special machining process can be enabled in which the workpiece is cut while vibration is applied. As a further alternative configuration, the in-machine robot 20 may discharge cooling fluid (cutting oil, cutting water) or air for removing swarf during the machining. By discharging the cooling fluid or the air by the in-machine robot 20 whose position and orientation can be freely changed, it becomes possible to more freely control the cutting characteristic and the temperature of the workpiece 110 and the tool 100.

Alternatively, the in-machine robot 20 may execute various sensing processes, for example, during the machining of the workpiece 110, or before or after the machining. Specifically, for example, the in-machine robot 20 may monitor a cutting state (precision of machined surface and state of swarf). As an alternative configuration, the in-machine robot 20 may sense the states of the workpiece 110 and the tool 100, for example, the temperature, the vibration, the distortion, or the like during the machining, and output the sensed result to the control device 34. In this case, the control device 34 desirably changes various machining conditions (feed rate, rotational rate, or the like) as necessary, based on the information detected by the in-machine robot 20. Alternatively, the in-machine robot 20 may have a structure in which the shape of the workpiece 110 is measured before start of the machining or after completion of the machining. By measuring the shape of the workpiece 110 before the start of the machining, it is possible to reliably prevent error in the attachment of the workpiece 110. By measuring the shape of the workpiece 110 after the completion of the machining, it is possible to judge quality of the machining result. As an alternative configuration, for example, the in-machine robot 20 may measure the states of the tool 100 (amount of wear, or the like) before the start of the machining or after the completion of the machining.

Further, the in-machine robot 20 may execute a work not directly related to the machining. Specifically, the in-machine robot 20 may execute a cleaning work for collecting the swarf which is spread in the machining chamber during the machining or after the completion of the machining. As an alternative configuration, the in-machine robot 20 may inspect the tool (checking presence/absence of wear or the like) or inspect movable parts of the machine tool 10 during a period in which the machining is not executed.

Figure 4:
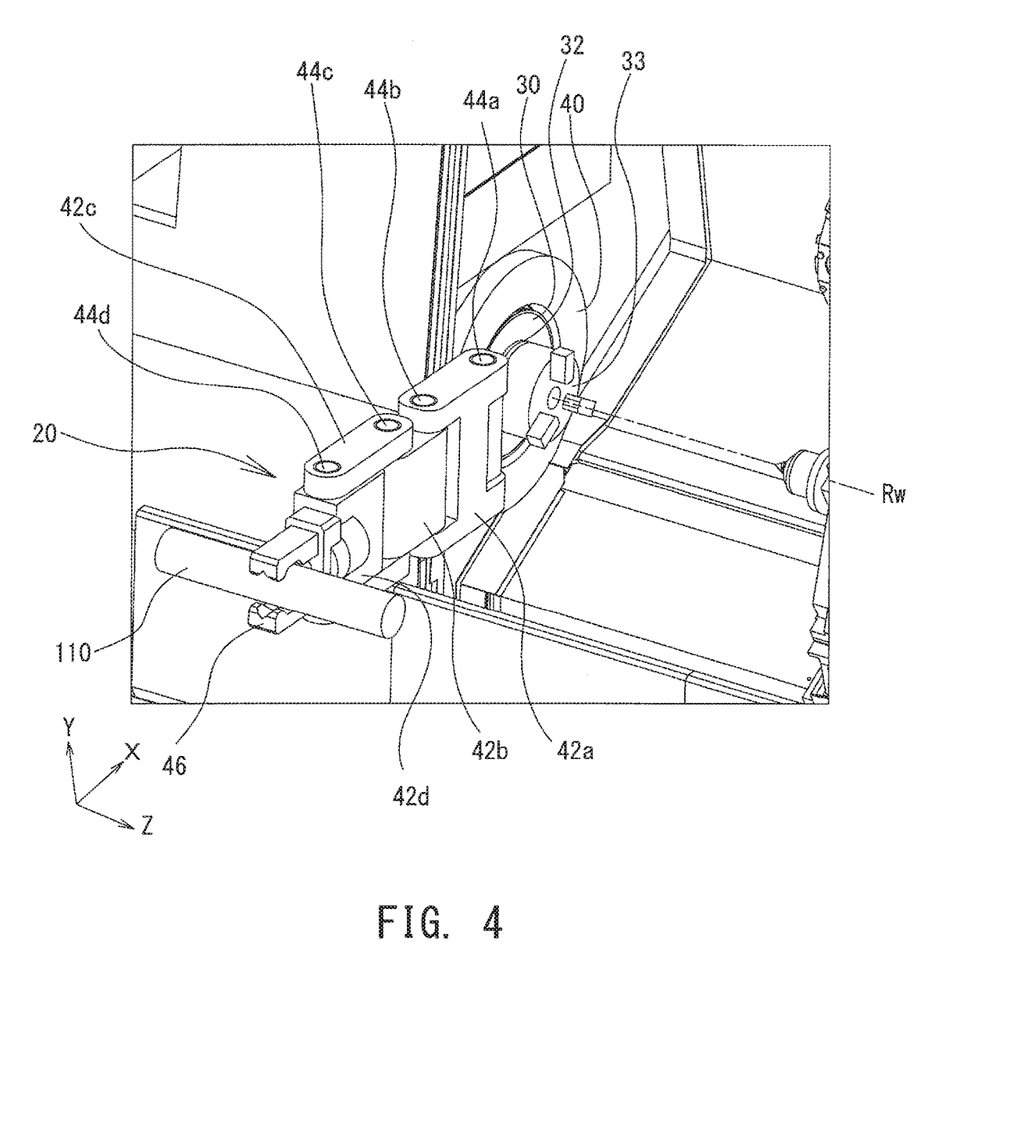
FIG. 4 is an enlarged view of a periphery of a workpiece spindle device.
Figure 5:
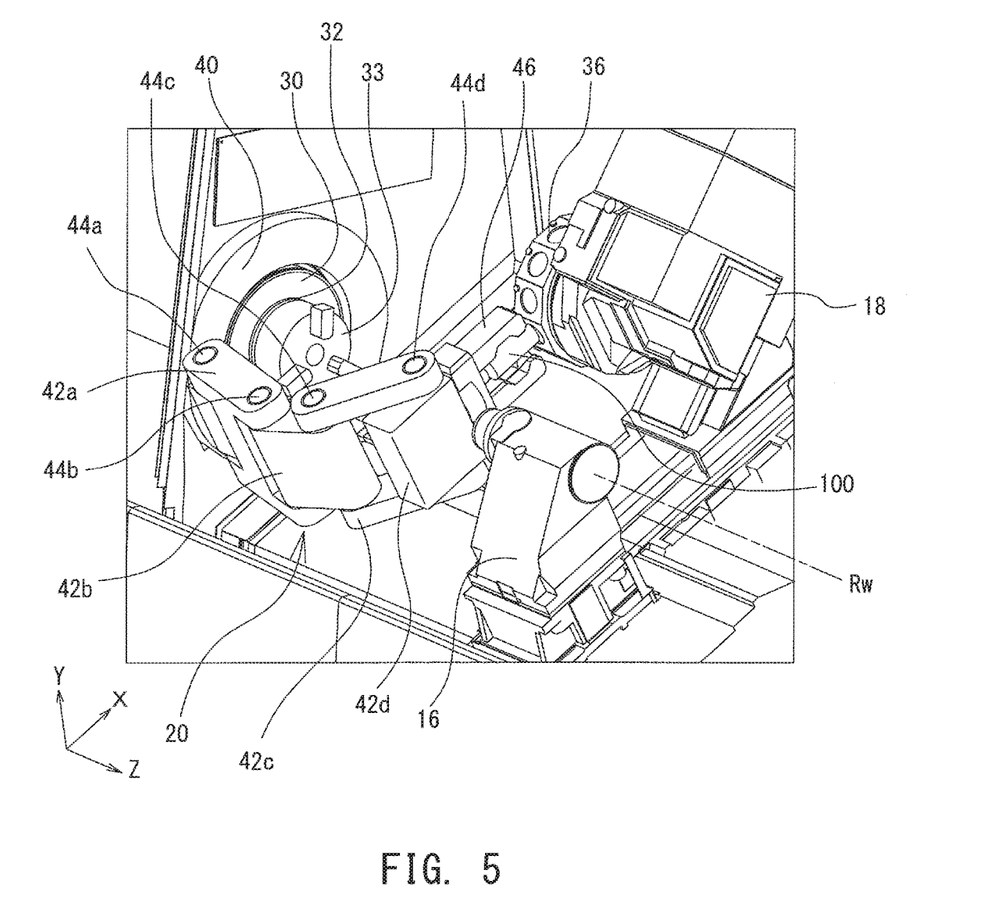
FIG. 5 is an enlarged view of a periphery of a workpiece spindle device.
Figure 6:
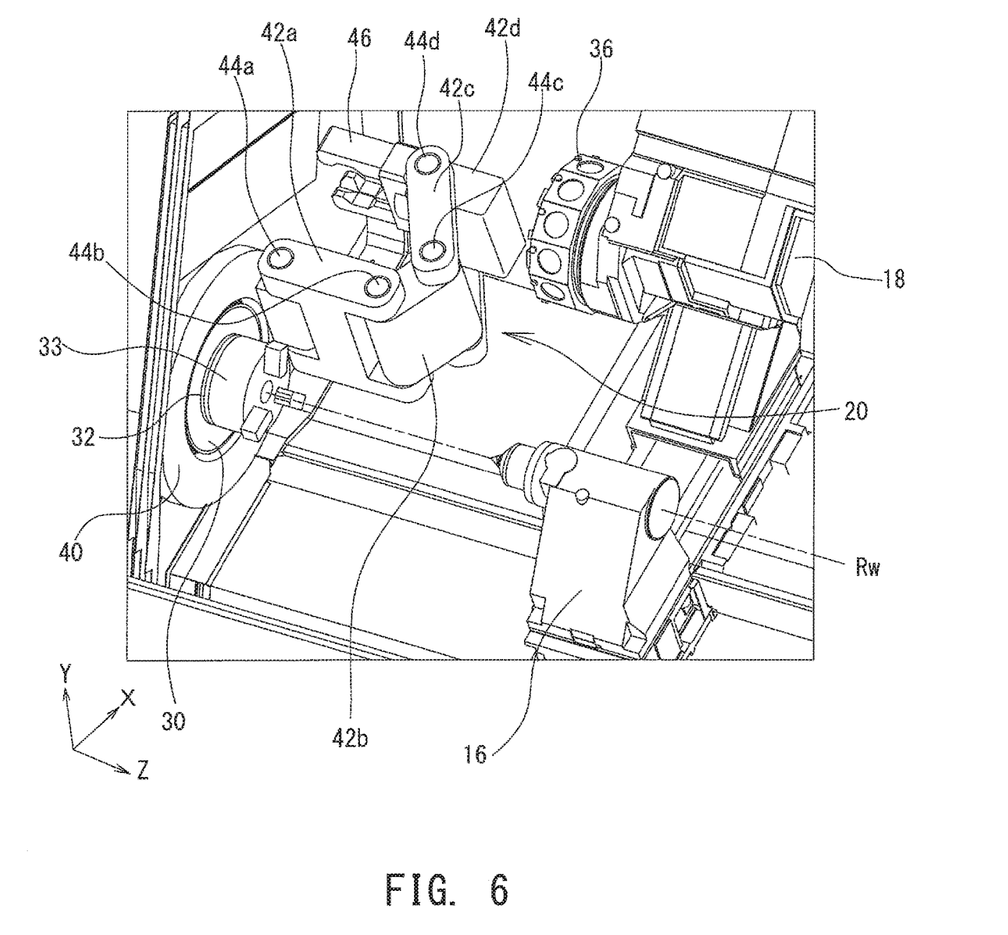
FIG. 6 is an enlarged view of a periphery of a workpiece spindle device.

Further, the in-machine robot 20 may execute the work which has been executed by an out-of-machine robot in the related art, during the machining or after the completion of the machining. For example, the in-machine robot 20 may execute additional machining (such as removal machining such as trimming and die polishing, surface reformation, adding machining, or the like) on the workpiece 110. In addition, the in-machine robot 20 may transport, exchange, or arrange the workpiece 110 and the tool 100. FIG. 3 shows reverting of the workpiece 110 (rotation of the workpiece 110 by 180 degrees around the X-axis) by the in-machine robot 20. In the example configuration of FIG. 3, in order to facilitate the reverting, the end effector 46 can self-rotate around a long axis of the fourth arm 42d (axis orthogonal to the rotational axis of the fourth joint 44d). FIG. 4 shows reception, by the in-machine robot 20, of the workpiece 110 from outside of the machine, or exiting of the workpiece 110 by the in-machine robot 20. As shown in FIG. 4, when the connecting mechanism 40 is fixed with a brake or the like in an orientation where all rotational axes of the joints 44a-44d are vertical, the in-machine robot 20 would have a structure of a scalar-type robot. In this case, the torque necessary for driving the joints 44a-44d of the in-machine robot 20 can be kept small, and it becomes easy to transport a heavy object to a far location. FIG. 5 shows changing of the tool 100 by the in-machine robot 20. Alternatively, maintenance or inspection may be executed for an inner surface of the machining chamber using the in-machine robot 20. FIG. 6 shows maintenance of the inner surface of the machining chamber by the in-machine robot 20. Alternatively, the in-machine robot 20 may examine or assemble various components.

As described above, the in-machine robot 20 may be used for various purposes. The type of the end effector 46 provided on the in-machine robot 20 may be selected according to the purpose desired for the in-machine robot 20. When such an in-machine robot 20 is used, it is desired that the in-machine robot 20 can access at least the workpiece 110 and the tool 100 used for the machining. In order to widen the access range of the in-machine robot 20, if the movable range of the in-machine robot 20 itself (that is, the movable range of the end effector 46 with respect to the connecting mechanism 40) is to be widened, a moving mechanism of the in-machine robot 20 becomes large. As a result, the size of the in-machine robot 20 would be increased, possibly causing a problem such as interference with other members. In addition, with the increase in the size of the in-machine robot 20, a size of the actuator such as the motor for driving the in-machine robot 20 is also increased, resulting in a problem of also increasing weight and cost of the in-machine robot 20 as a whole.

As described above, the in-machine robot 20 is attached to the workpiece spindle device 14. As is known, the workpiece spindle device 14 holds the workpiece 110 in a manner to allow self-rotation. Normally, in order to machine the workpiece 110, the tool 100 moves close to the workpiece 110. Therefore, by attaching the in-machine robot 20 to the workpiece spindle device 14, it becomes possible to position the in-machine robot 20 near the workpiece 110 and the tool 100 even if the movable range of the in-machine robot 20 itself is narrow. As a result, it becomes possible to enable even an in-machine robot 20 having a relatively small size and a small movable range to reliably access the tool 100 and the workpiece 110 during machining.

Figure 7:
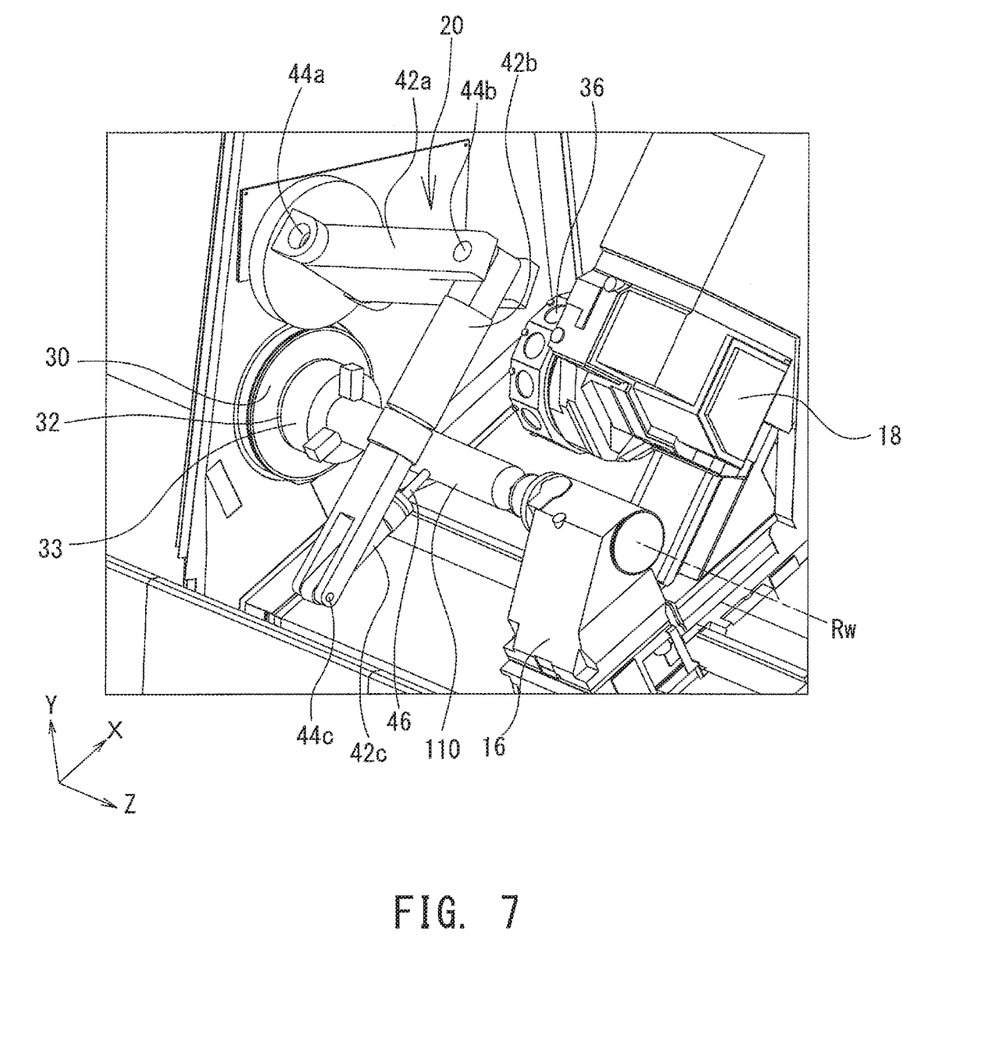
FIG. 7 is an enlarged view of a periphery of a workpiece spindle device in a machine tool of related art.

The in-machine robot 20 is attached to the spindle base 30 so that the in-machine robot 20 can move with the workpiece rotational axis Rw serving as a center. Because of this, even when the movable range of the in-machine robot 20 is small, the access direction and position of the in-machine robot 20 can be changed by a large amount. This characteristic will now be described with reference to FIG. 7. FIG. 7 is a diagram showing a case where the articulated in-machine robot 20 is fixed on an upper side of the workpiece spindle 32; that is, a case where the in-machine robot 20 cannot rotationally move around the workpiece rotational axis Rw. A case is considered in which the workpiece 110 is to be accessed from the negative side in the X-axis direction by the in-machine robot 20 fixed on an upper side in the vertical direction in relation to the workpiece spindle 32. In this case, as shown in FIG. 7, the in-machine robot 20 must extend across the front side of the workpiece spindle 32 and to a position on a more negative side in the X-axis direction in relation to the workpiece spindle 32. Because of this, in the in-machine robot 20, as compared to the in-machine robot 20 shown in FIGS. 1-6, the lengths of the arms 42 are significantly larger, and consequently, the size of the in-machine robot 20 as a whole is significantly larger. In this case, because the torque for driving the arm 42 having a large size and a heavy weight is increased, the size of the actuator such as the motor provided on each joint 44 must be increased. In addition, in a large arm 42, there also is a problem in that the interference with the other members tends to occur more frequently.

On the other hand, as repeatedly described above, the in-machine robot 20 shown in FIGS. 1-6 can rotate around the workpiece rotational axis Rw. Because of this, as shown in FIGS. 2-6, even with the in-machine robot 20 of a relatively small size, the direction of access and the position of the end effector 46 can be freely changed, and the amount of protrusion of the in-machine robot 20 can be kept small. As a result, the interference between the in-machine robot 20 and the other members can be effectively prevented. In addition, because the size of the arm 42 can be reduced, the torque for driving each arm 42 can be reduced, and the size of the actuator such as the motor provided on each joint 44 can be reduced.

The structure of the in-machine robot 20 described above is merely exemplary. No particular limitation is imposed on the structure of the in-machine robot 20, so long as the in-machine robot 20 is attached in a state where the in-machine robot 20 can move with the workpiece rotational axis Rw serving as a center. Therefore, the numbers, directions of swing, or the like of the joints 44 and the arms 42 of the in-machine robot 20 can be suitably changed.

For example, desirably, the in-machine robot 20 is an arm-type robot having one or more arms and one or more joints, but alternatively, the in-machine robot 20 may be of another type. Therefore, the in-machine robot 20 may be, for example, an orthogonal robot formed by two or three orthogonal slide axes, a parallel-link robot which uses a parallel mechanism, or the like. Further, a center axis of the movement of the in-machine robot 20 does not need to strictly coincide with the workpiece rotational axis Rw, and there may be a slight deviation. In addition, the connecting mechanism 40 may have other structures, so long as the connecting mechanism 40 attaches the in-machine robot 20 to the machine tool 10 so that the in-machine robot 20 moves with the workpiece rotational axis Rw as a center. For example, the connecting mechanism may have a structure with an approximate ring-shaped or approximate rectangular rail placed around the workpiece spindle 32. In this case, the in-machine robot 20 is formed to be movable along the rail. The connecting mechanism 40 may be a separate member from the in-machine robot 20 or may be integrated with the in-machine robot 20. It is sufficient that the structure allows the primary portions of the in-machine robot 20 to move with the workpiece rotational axis Rw serving as a center.

In the machine tool of the present disclosure, the in-machine robot 20 is attached on the workpiece spindle device 14 which holds the workpiece 110 in a manner to allow self-rotation. Alternatively, the in-machine robot 20 may be attached on other parts, so long as the in-machine robot c20 can move with the workpiece rotational axis Rw serving as a center. For example, the in-machine robot 20 may be attached on the tailstock 16 via the connecting mechanism 40. The tailstock 16 is also a member which supports the workpiece 110. By attaching the in-machine robot 20 on the tailstock 16, it becomes possible for the in-machine robot 20 to reliably access the workpiece 110.

The machine tool 10 of the present disclosure is a lathe; more specifically, a turning center, but alternatively, the in-machine robot 20 and the connecting mechanism 40 of the present disclosure may be used for machine tools of other kinds. For example, the in-machine robot 20 and the connecting mechanism 40 may be a lathe or a cylindrical grinding machine, and, in this case, the in-machine robot 20 is desirably attached on the workpiece spindle device or the tailstock via the connecting mechanism 40. In addition, it is sufficient that the machine tool has a rotary device which holds the workpiece 110 in a rotatable manner with a predefined workpiece rotational axis Rw serving as a center. Thus, for example, the machine tool may be a milling machine; in particular, a machining center, having a rotation table on which the workpiece 110 is placed. In this case, the in-machine robot 20 is desirably attached on the rotation table via the connecting mechanism 40. Moreover, the number of in-machine robots to be attached is not limited to one, and may be a plurality. For example, on one connecting mechanism 40, two in-machine robots 20, such as a workpiece gripping robot and a sensing robot, may be provided with a spacing of 180 degrees therebetween.

The invention claimed is:

1. A machine tool that machines a workpiece by a tool, the machine tool comprising:
   a rotary device that holds the workpiece in a rotatable manner with a predefined workpiece rotational axis serving as a center;
   one or more robots; and
   a connecting mechanism on which the one or more robots are attached so that the one or more robots rotate around the workpiece rotational axis independently from the workpiece.

2. The machine tool according to claim 1, wherein the robot can access at least one of the tool and the workpiece during execution of machining of the workpiece by the tool.

3. The machine tool according to claim 1, wherein the robot executes at least one of supporting the tool or the workpiece during machining of the workpiece by the tool, applying vibration to the tool or the workpiece during the machining, discharging fluid to the tool or the workpiece during the machining, sensing related to the tool or the workpiece during the machining, and additional machining.

4. The machine tool according to claim 2, wherein the robot executes at least one of supporting the tool or the workpiece during machining of the workpiece by the tool, applying vibration to the tool or the workpiece during the machining, discharging fluid to the tool or the workpiece during the machining, sensing related to the tool or the workpiece during the machining, and additional machining.

5. The machine tool according to claim 1, wherein the robot is an arm-type robot comprising:
   one or more end effectors that act on a target;
   one or more arms that support the one or more end effectors; and
   one or more joints provided at ends of the one or more arms.

6. The machine tool according to claim 1, wherein
the machine tool is a lathe or a cylindrical grinding machine, and
the rotary device is a workpiece spindle device that holds the workpiece in a manner to allow self-rotation.

7. The machine tool according to claim 1, wherein
the machine tool is a milling machine or a machining center, and
the rotary device is a rotation table on which the workpiece is placed.

8. The machine tool according to claim 1, wherein
the robot is attached on the rotary device via the connecting mechanism.

9. The machine tool according to claim 6, wherein
the robot is attached via the connecting mechanism to a tailstock placed opposing the workpiece spindle device.

10. The machine tool according to claim 1, wherein
the connecting mechanism has an approximate ring shape surrounding an outer periphery of the workpiece rotational axis and rotates with respect to the workpiece rotational axis so that the one or more robots rotate along the outer periphery of the workpiece rotational axis.

* * * * *